US012622826B2

(12) United States Patent
Jeihani et al.

(10) Patent No.: US 12,622,826 B2
(45) Date of Patent: May 12, 2026

(54) AUTONOMOUS MOBILITY SYSTEM

(71) Applicant: Morgan State University, Baltimore, MD (US)

(72) Inventors: Mansoureh Jeihani, Baltimore, MD (US); Kofi Nyarko, Millersville, MD (US); Eazaz Sadeghvaziri, Fresno, CA (US); Anam Ardeshiri, Ellicott City, MD (US); Nile Walker, Columbia, MD (US)

(73) Assignee: Morgan State University, Baltimore, MD (US)

( * ) Notice: Subject to any disclaimer, the term of this patent is extended or adjusted under 35 U.S.C. 154(b) by 778 days.

(21) Appl. No.: 17/885,080

(22) Filed: Aug. 10, 2022

(65) Prior Publication Data

US 2023/0064211 A1 Mar. 2, 2023

Related U.S. Application Data

(60) Provisional application No. 63/358,706, filed on Jul. 6, 2022, provisional application No. 63/231,379, filed on Aug. 10, 2021.

(51) Int. Cl.
| | |
|---|---|
| *A61G 5/04* | (2013.01) |
| *A61G 3/06* | (2006.01) |
| *A61G 3/08* | (2006.01) |
| *H04W 4/40* | (2018.01) |

(52) U.S. Cl.
CPC .............. *A61G 5/04* (2013.01); *A61G 3/061* (2013.01); *A61G 3/0808* (2013.01); *H04W 4/40* (2018.02); *A61G 2203/14* (2013.01);

*A61G 2203/22* (2013.01); *A61G 2203/30* (2013.01); *A61G 2203/70* (2013.01); *A61G 2203/726* (2013.01); *A61G 2205/10* (2013.01); *A61G 2220/145* (2013.01)

(58) Field of Classification Search
CPC .... A61G 3/08; A61G 3/0808; A61G 2205/10; A61G 2203/22
See application file for complete search history.

(56) References Cited

U.S. PATENT DOCUMENTS

| | | | | |
|---|---|---|---|---|
| 2016/0284202 A1* | 9/2016 | Traughber | ............. | G16H 80/00 |
| 2017/0267401 A1* | 9/2017 | Reznikov | ................. | B65D 7/24 |
| 2019/0310647 A1* | 10/2019 | Dean | ...................... | G05D 1/246 |
| 2021/0369516 A1* | 12/2021 | Basu | ...................... | G06V 20/59 |
| 2022/0211568 A1* | 7/2022 | AlGhazi | ................. | A45B 3/00 |
| 2023/0000699 A1* | 1/2023 | Wooden | ................. | A47C 7/666 |

* cited by examiner

*Primary Examiner* — Christopher B Wehrly
(74) *Attorney, Agent, or Firm* — Whiteford, Taylor & Preston, LLP; Peter J. Davis

(57) ABSTRACT

An integrated and autonomous mobility system for disabled persons including an automated wheelchair (AV) and an Adapted Automated Vehicle (AAV) configured to work together as an integrated unit to transport a user to a pre-selected destination with little to no input from the user during the trip. The AV is also configured to operate independently of the AAV to transport the user on shorter trips, or to continue a journey after the AAV has transported the AW to an intermediate destination. Multiple safety systems are included. The system has an override function according to which a user can interrupt the automated transport operation and cause the AV and/or AAV to stop, slow down, speed up, or change direction.

10 Claims, 5 Drawing Sheets

AUTONOMOUS MOBILITY SYSTEM

BACKGROUND OF THE INVENTION

Field of the Invention

The present invention relates to mobility devices and systems for persons with disabilities.

Description of the Background

Over 3 million people use a wheelchair full-time. One of the major challenges of this population group is their transportation needs. In 2017, 25.5 million Americans aged 5 and older self-reported travel-limiting disabilities. The Americans with Disabilities Act of 1990 (ADA) is the landmark civil rights law that addressed the rights of people with disabilities. Title II of the ADA prohibits discrimination on the basis of disability in public transportation services, such as city buses and public rail systems (subways, commuter trains, etc.). Enhancing the comfort and convenience of drivers/passengers with disabilities has not historically been a focus for car manufacturers due to the belief that even with such innovations, an individual with a disability wouldn't be able to drive independently. However, Automated Vehicle (AV) technologies have given rise to the aspiration of abolishing travel-limiting disabilities. The AV era is on the horizon, and it is predicted that that level-4 AVs (high but not full automation) could comprise 24.8%-87.2% of the vehicle fleet by 2045. While the AV offers a huge promise for the safety and mobility of the existing market of drivers with full driving ability, the overlooked market of people with disabilities should be equally enlivened. The USDOT is committed to ensuring that all users can equally benefit from AV technologies, including people with disabilities. People with disabilities have inherent difficulties with their on-demand transportation services to access healthcare, grocery stores, pharmacies, and to take long-distance trips. Although AVs can enhance the freedom of people with disabilities, no AV system has been introduced to specifically address the needs of such individuals.

SUMMARY OF THE INVENTION

The present invention is an integrated autonomous mobility solution for persons with disabilities. A first part of the invention is an Automated Wheelchair (AW), and a second part of the invention is an Adapted Automated Vehicle (AAV). The AW and the AAV are adapted to automatically communicate with, and integrate with, and operate in conjunction with one-another to transport the user on trips of varying lengths with little to no user interaction after the destination has been communicated to the system.

The AW includes standard motorized wheelchair features together with numerous additional features necessary for safe and efficient autonomous operation with little or no user input after a destination has been selected. In the case of shorter trips, a user instructs the system to navigate to a selected destination, and the AW transports the user to the selected destination with little to no further instruction or action by the user. An onboard navigation system is provided to allow the AW to navigate to selected destinations through the best route with minimum manual intervention. The AW is equipped with ultrasonic and optical sensors to avoid colliding with obstacles on its path, a navigation system including real-time GPS tracker, and an adjustable cargo carrier for carry-on baggage.

In the case of longer trips, the AW will navigate to and enter the AAV, handing over automated driving functions to the AAV via electronic "handshake," either by hard-wired or wireless communications. The AAV has a wheelchair ramp or lift configured allow the AW to be brought on board. Once the AW is on board the AAV, the AW can move to an AAV transport position under its own control, or it can be moved to an AAV transport position by a moving track/conveyor on the floor or walls of the AAV. The AAV preferably has additional space for cargo. Once the AW has entered the AAV, it is automatically secured in an AAV transport position using wheelchair wheel and/or wheelchair body securing brackets/braces, and the AAV navigates to an intermediate destination using an AAV onboard navigation system and autonomous drive control system based on input received from the AW, or directly from a remote user input device. Once the AAV has arrived at the intermediate destination, for example, a family member or friend's driveway or apartment parking lot, an airport departures terminal, a restaurant or hotel valet station, the AW automatically disengages from the AAV securing brackets, moves to the AAV lift or ramp, again, using either AW navigation features or an AAV onboard tack or conveyor, and, once it has left the AAV, automatically navigates to the final destination. At any time, the user can override and/or change the automatic navigation by voice, gesture, keyboard or other input to cause the AW or the AAV to stop, slow down, speed up, or change direction.

According to a further embodiment of the invention, there is provided a low-cost AV infrastructure including printed QR codes placed on or near the ground at intervals along known or predicted AW routes to provide the AW additional confirmation of location and route. In addition, or as an alternative, pre-set AW travel lanes may be provided on sidewalks and in public hallways, for example in shopping malls and airports, using high contrast adhesive strips that sensors on that sensors on the AW can easily detect and follow.

Using the integrated mobility system of the invention, a user with disabilities can make short trips, such as grocery stores and pharmacies, as well as long trips, for example, even to different cities, all under automated control with little to no input from the user. The integrated mobility system of the invention can even handle trips with multiple segments, where the AW navigates to the AAV, the AAV navigates to an intermediate location, and the AW leaves the AAV and navigates to a final destination. The AAV can access and use all types of roads such as arterials and highways, and the AW can access and use public sidewalks, park pathways, bicycle paths, rail trails, and the interior of public buildings.

The mechanical and electronic integration of AW with an AAV according to the invention makes the user completely independent.

Accordingly, there is provided according to the invention an autonomous mobility system including a wheelchair and a self-driving vehicle, the wheelchair having a user seat and seat back; drive wheels; a motor coupled to the drive wheels, an onboard computer in electronic communication with the motor, the onboard computer including a processor and non-transient memory, the non-transient memory including a global positioning system (GPS) and a navigation software module; the wheelchair also including an input device in electronic communication with the onboard computer; inertial sensors in electronic communication with the onboard computer; a plurality of ultrasonic sensors in electronic communication with the onboard computer and configured to detect obstacles on or near a travel path of the device; at least one Quick Response (QR) code reader in electronic communication with the onboard computer and configured to read QR codes; a manual override input device in electronic communication with the onboard computer and configured to send a navigation interrupt signal to the navigation system; an emergency contact input device in electronic communication with emergency service providers; and an antenna in electronic communication with the onboard computer configured for cellular-based internet connection. The autonomous mobility system also includes a single occupancy level 4 or higher automated self-driving vehicle (AAV), the AAV having a wheelchair loading device; a wheelchair securing mechanism; an AAV onboard computer including a processor and non-transient memory configured to communicate wirelessly with the wheelchair onboard computer to automatically activate the wheelchair loading device when the wheelchair approaches the AAV, to activate the wheelchair securing mechanism when the wheelchair is in an AAV transport position, and to accept automated navigation control from the wheelchair onboard computer.

According to further embodiments of the invention, the wheelchair may include one or more of the following, a canopy to protect the user from sun, rain, wind and/or snow, a mobile computing device holder and an adjustable cargo carrier.

According to another embodiment of the invention, the wheelchair onboard computer may be in electronic communication with the Health Care Interpreter Network (HCIN) to assist users with language barriers.

According to still further embodiments of the invention, the QR code readers may be configured to follow navigation lines and for identifying location(s) of the wheelchair.

According to still further embodiments of the invention, the wheelchair input device may be configured to receive voice and/or text instructions.

According to still further embodiments of the invention, the wheelchair navigation software module may be configured to receive instructions via the input device or from a remote device via wireless communication.

According to still further embodiments of the invention, the manual override input device is a joystick.

According to another embodiment of the invention, an autonomous mobility system may be provided including an integrated autonomous AW/AAV device and a plurality of printed QR codes placed on the ground along potential or actual AW travel routes.

BRIEF DESCRIPTION OF THE DRAWINGS

The foregoing summary, as well as the following detailed description of the preferred invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

Figure 1:
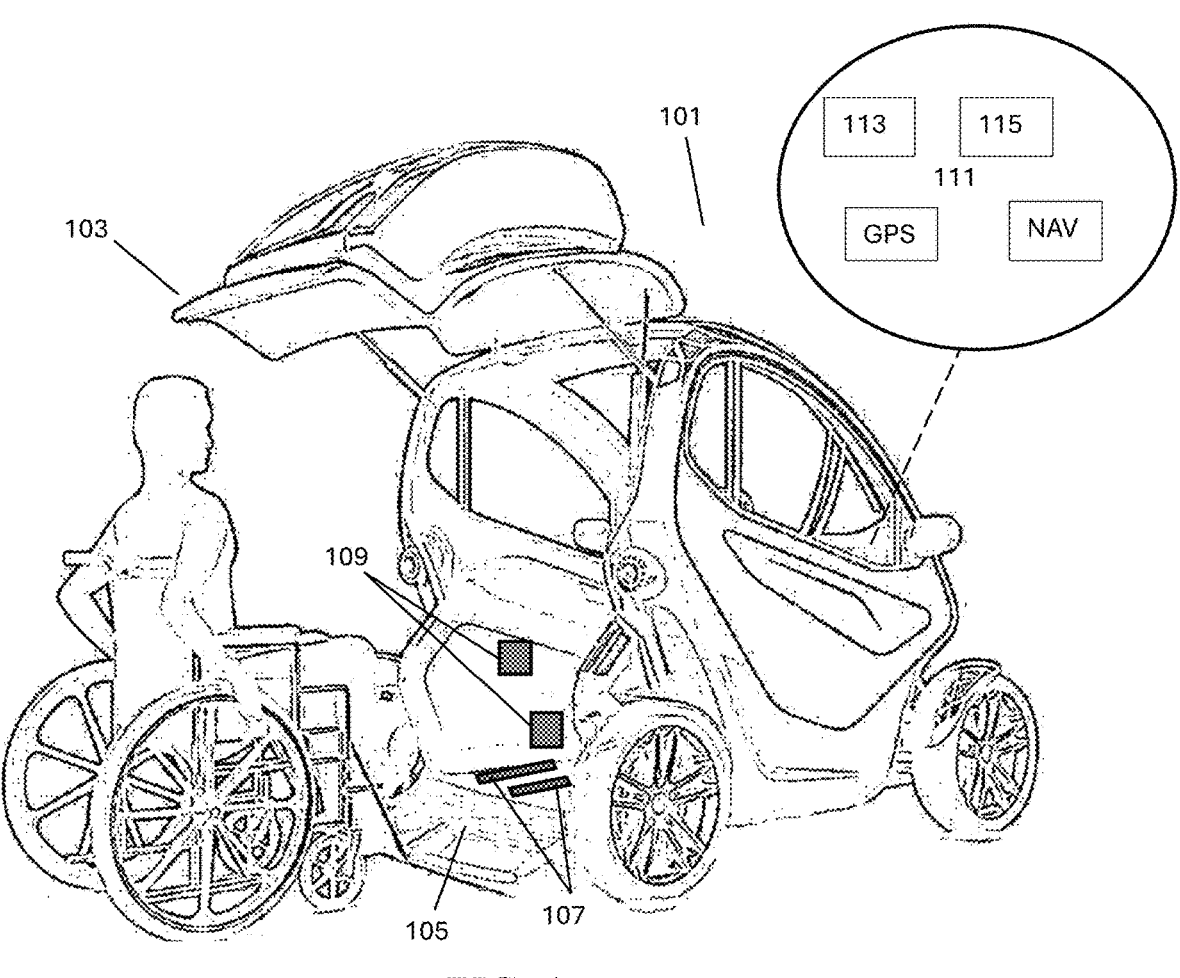
FIG. 1 is a representation of an integrated autonomous mobility system according to an embodiment of the invention.

Features in the attached drawings are numbered with the following reference numerals:

| 1 | Autonomous Wheelchair (AW) |
|---|---|
| 3 | Wheelchair Seat |
| 5 | Wheelchair Seat Back |
| 7 | Drive Wheels |
| 9 | Motor |
| 11 | Battery |
| 13 | Wheelchair Computer |
| 15 | Wheelchair Computer Processor |
| 17 | Wheelchair Computer Memory |
| 19 | Wheelchair GPS |
| 21 | Wheelchair Navigation Module |
| 23 | Wheelchair Computer Input Device |
| 25 | Inertial Sensors |
| 27 | Ultrasonic Sensors |
| 29 | QR Code Reader |
| 31 | Manual Override Input Device |
| 33 | Emergency Contact Input Device |
| 37 | Canopy |
| 39 | Mobile Computing Device Holder |
| 41 | Adjustable Cargo Carrier |
| 101 | Automated Self Driving Vehicle (AAV) |
| 103 | Wheelchair Entry Hatch |
| 105 | Wheelchair Loading Device |
| 107 | Wheelchair wheel track/conveyor |
| 109 | Wheelchair Securing Bracket/Brace |
| 111 | AAV Onboard Computer |
| 113 | AAV Computer Processor |
| 115 | AAV Computer Memory |
| 201 | Remote Computing Device |

DETAILED DESCRIPTION OF THE INVENTION

Figure 2:
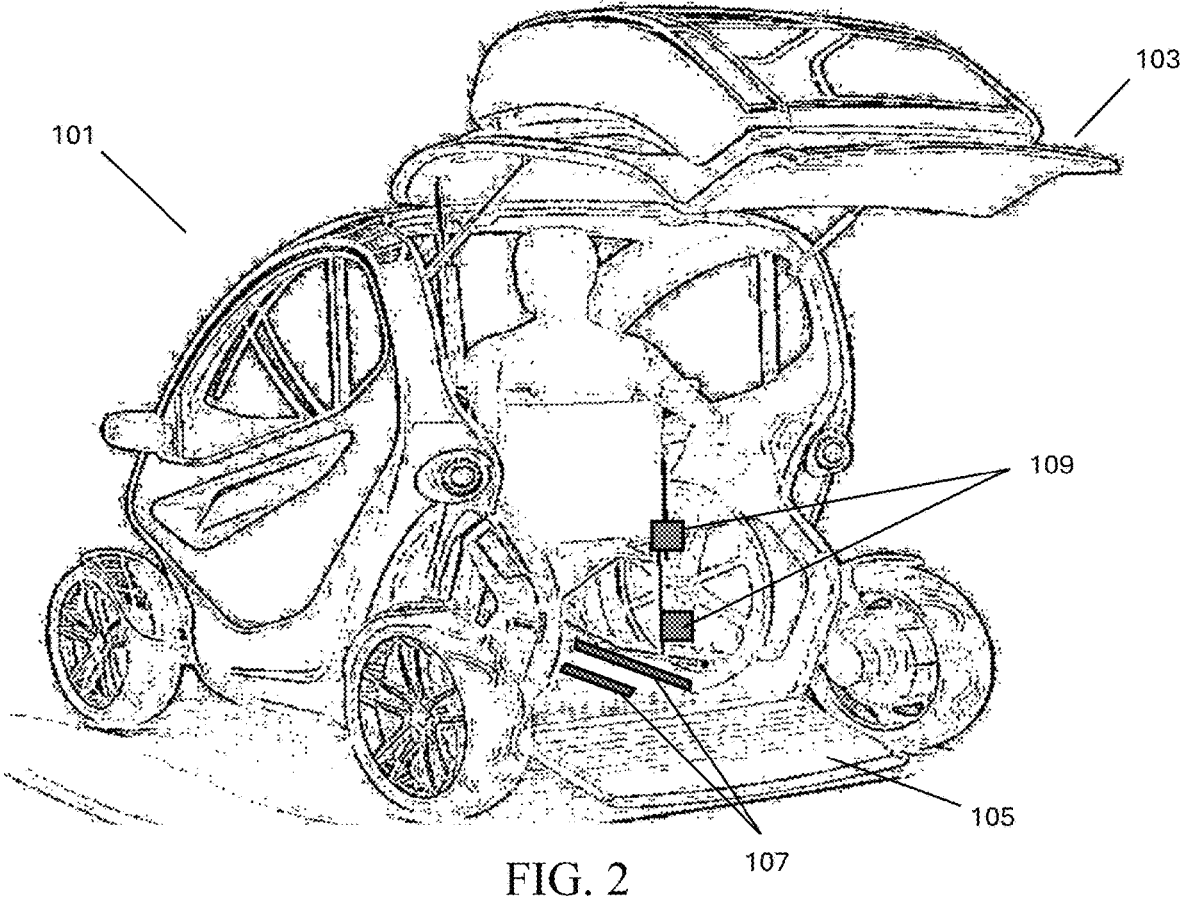
FIG. 2 is a second representation of an integrated autonomous mobility system according to an embodiment of the invention.

As outlined in the Summary of the Invention, the present invention is an autonomous mobility system including a wheelchair and a self-driving vehicle configured to work together to autonomously transport a user to various destinations, near and far, after a destination has been input to the system. Referring to the Figures, FIGS. 1 and 2 show a level-4 automated Adapted Automated single occupancy Vehicle (AAV) 101 according to an embodiment of the invention having wheelchair accessible hatch 103, wheelchair loading device 105, which may be, for example, a lift or a ramp. The AAV 101 may optionally have a wheelchair track or conveyor system 107 to move a loaded wheelchair into a transport position (shown in FIG. 2). Wheelchair securing brackets 109 may automatically engage and secure the wheelchair once it is parked in the transport position. AAV 101 is equipped with computer system 111, including processor 113, memory 115, communication hardware and software, global positioning hardware and software and navigation software.

Figure 3:
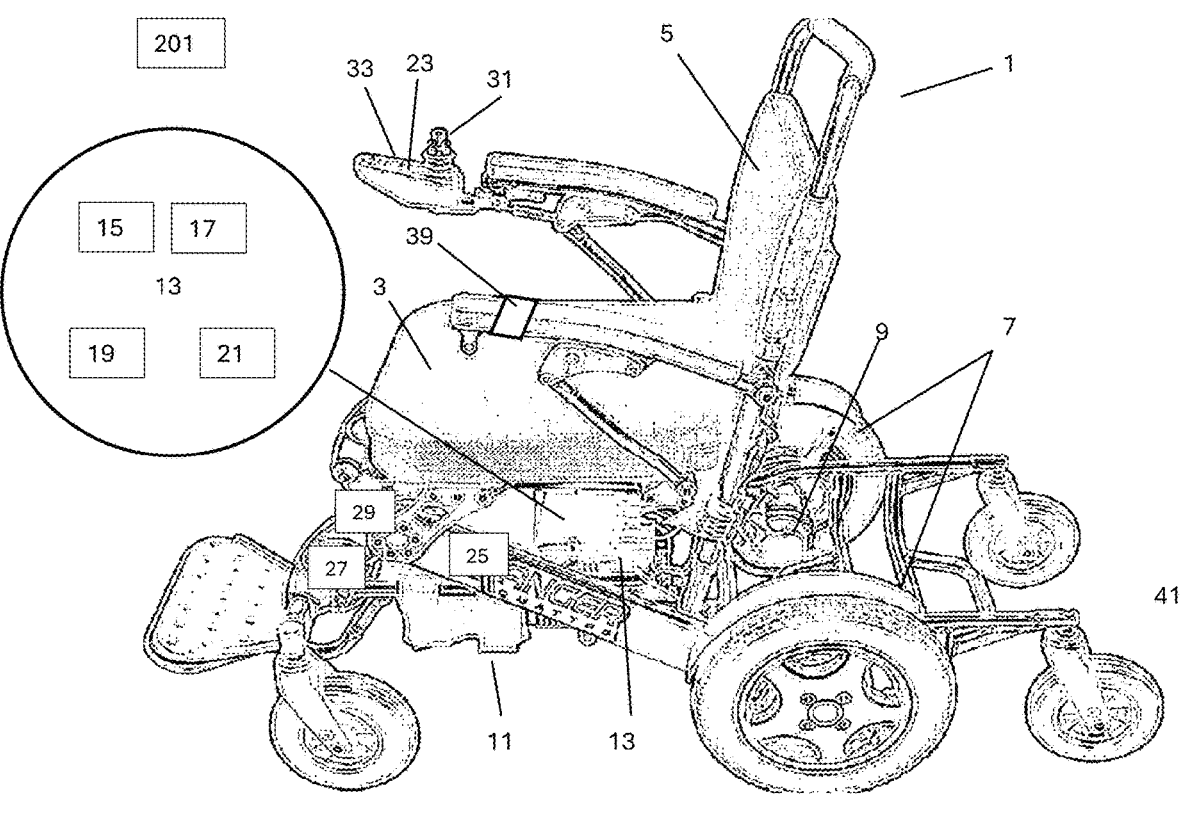
FIG. 3 shows an automated wheelchair according to an embodiment of the invention.
Figure 4:
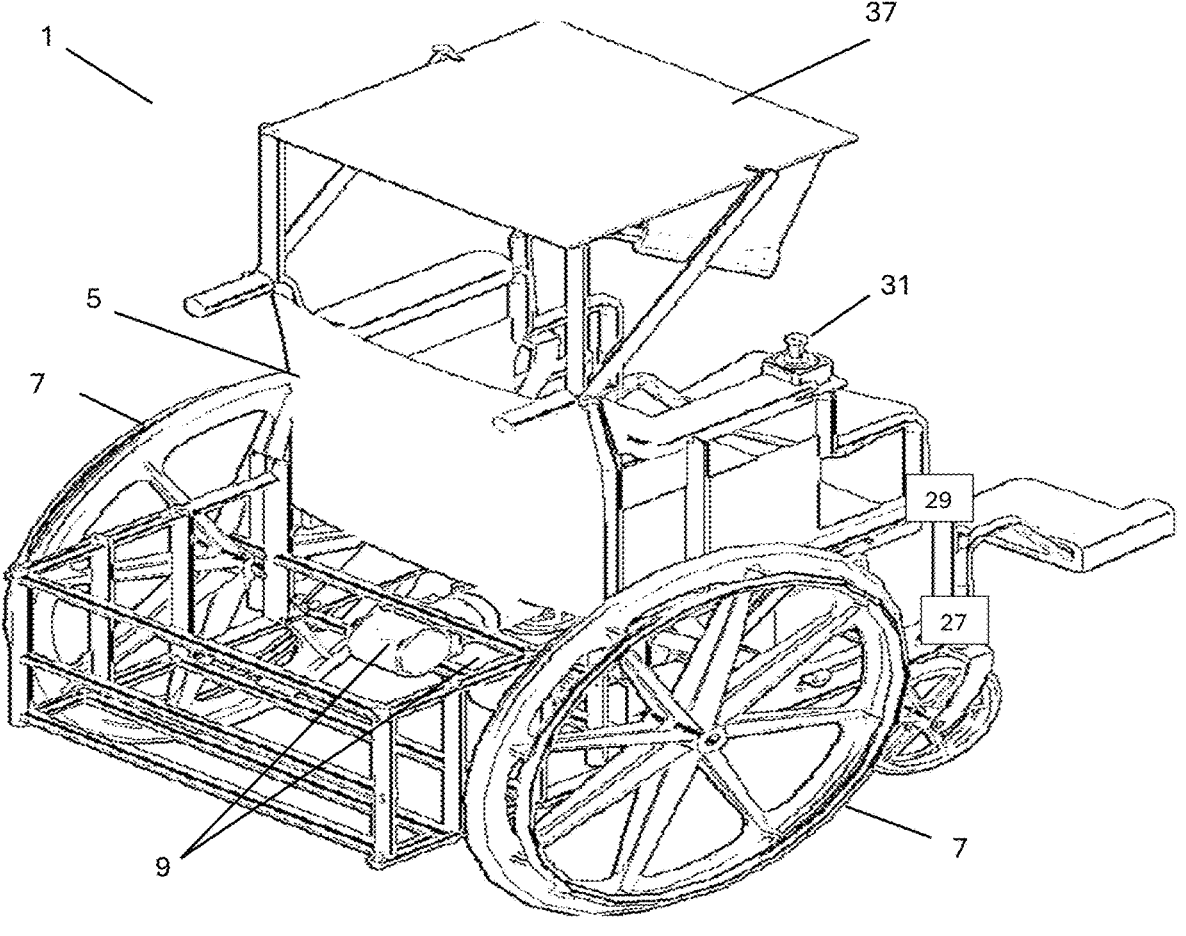
FIG. 4 shows an automated wheelchair according to another embodiment of the invention

FIGS. 3 and 4 show two different embodiments of an automated wheelchair 1 portion of the autonomous mobility system. Both embodiments include wheelchair set 3, wheelchair seat back 5, drive wheels 7 driven by motor 9 powered by battery 11. The embodiment of FIG. 4 includes canopy 37 to protect the user from sun, rain, wind, and snow. Onboard computer 13 includes processor 15 and memory 17. Automated wheelchair 1 includes global positioning (GPS) software and hardware 19 which may be part of or separate from computer 13. GPS 19 is in communication with or integrated with navigation module 21. A wheelchair computer input device 23 allows a user to command the navigation system using text, voice, or other input methods to provide the navigation system with destination information and travel preferences. Input to the navigation system may also be accomplished remotely from a user or user helper's remote computing device 201, such as desktop or laptop computer, or cellular mobile device. In the case of a user laptop or mobile device, the wheelchair 1 may be equipped with mobile computing device holder 39. The automated wheelchair 1 may be provided with antenna to facilitate cellular and/or wireless internet and Bluetooth connections.

Wheelchair 1 also may include inertial sensors 25 to monitor and report to onboard computer 13 acceleration and direction changes, ultrasonic sensors 27 to detect and report to onboard computer 13 obstacles in or near the travel path, and one or more QR code readers 29, such as cameras, to read printed QR codes situated along known or predicted wheelchair travel routes which the computer 13 may use to confirm wheelchair location and travel path.

Automated wheelchair 1 may also include manual override input device 31 that the user may engage to immediately interrupt and countermand ongoing navigation transport to stop, slow down, speedup or change the direction of the automated wheelchair. For additional safety measures, the automated wheelchair 1 may additional be provided with an emergency contact input device 33 that the user may use to immediately contact family members for assistance and/or summon emergency services such as ambulance and/or police.

In operation, a user inputs a destination into the system via remote device 201, a connected mobile device, or via onboard input device 23. An onboard computer 13 including one or more processor(s) 15 and memory 17 receives the destination instructions and computes a wheelchair-navigable route to the selected destination, or in the case of a longer trip, to the AAV. The AW then autonomously transports the user to the selected destination or to the AAV, which may have navigated autonomously to the meeting location under wireless command of the AW. Navigation of the AW takes place under control of the navigation system with input from one or more of QR code readers 29, ultrasonic sensors 27, inertial sensors 25, and if desired, but not required, additional user input via the override input device 31.

In the case of a longer distance trip, the AW navigates to the AAV, and announces its presence or its presence is detected by the AAV. The AAV is preferably a level-4 automated single occupancy vehicle integrated with the AW. The AAV opens the entry hatch 103, and the AW enters the AAV automatically via the AAV loading device 105, which may be a lift or ramp or combination thereof. The AW then moves to a transport position, either under its own autonomous control, or under control of a conveyor system 107 in the floor of the AAV. Once the AW has arrived at the correct AAV transport position as detected by the AAV computer 111, the AW may be automatically secured in position by securing brackets and/or braces 109. Sometime during this loading process, or shortly thereafter, the AW and AAV computers undertake an electronic handshake and, in a first embodiment, navigational destination and control is handed to the AAV, and the AAV travels to the next destination under its own autonomous control, preferably providing regular updates to the AW, which may verify such updates using its own navigation and GPS systems. According to an alternate embodiment, the electronic handshake allows the AW computer to take command of the AAV drive systems, and the driving of the AAV is driven under command of the AW computer. In either embodiment, the user's manual override input device 31 has full control over both AW and AAV drive functions. Similarly, emergency contact input device remains fully operational at all times.

When the AAV has arrived at the programmed destination, or intermediate destination, the AV stops at a designated drop-off location, allowing the AW to move out of the vehicle and onto the final destination. The AAV then reverses the loading mechanism, closes the entry hatch and then performs self-parking or returns to a rental or on-request station.

Figure 5:
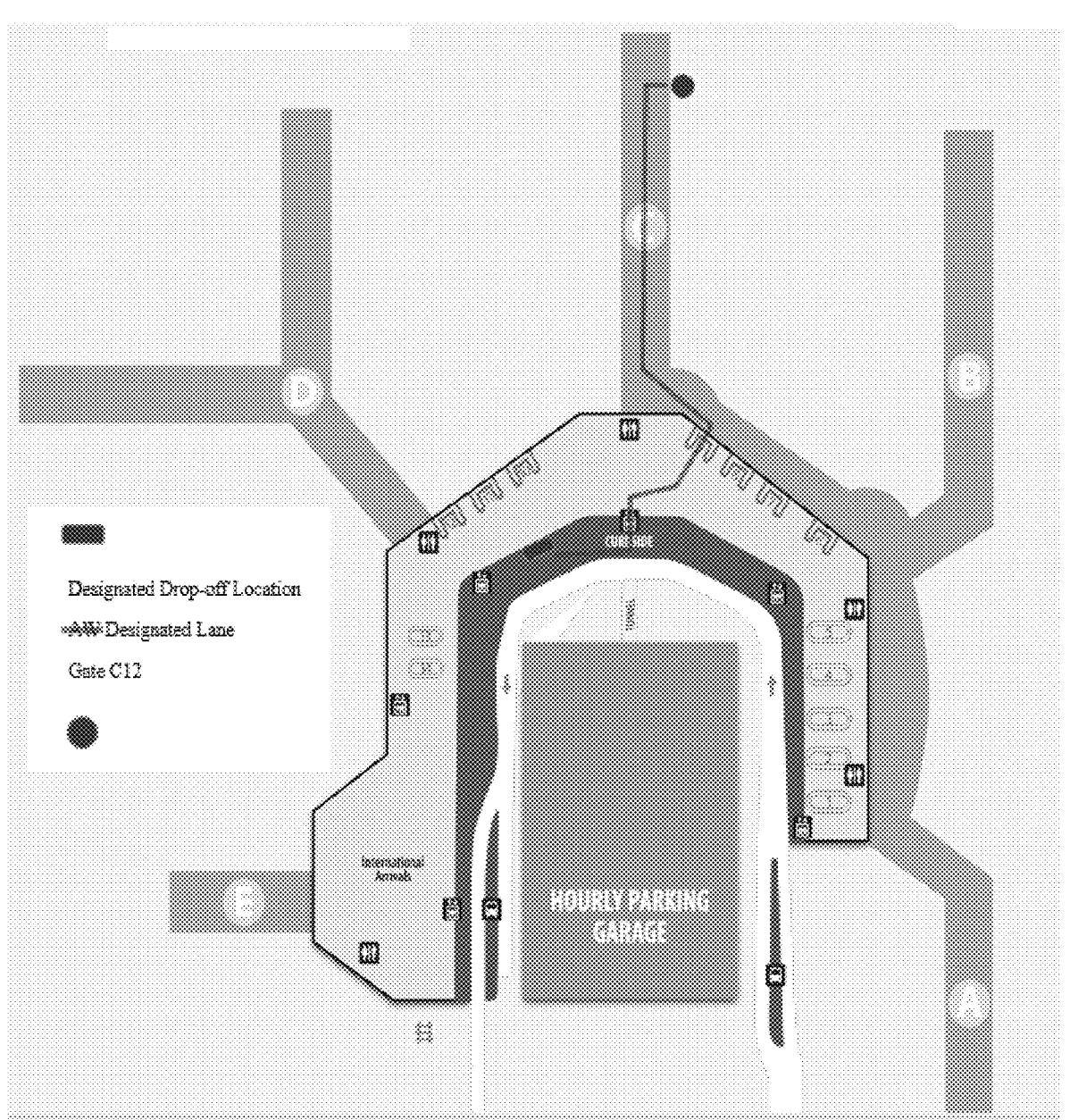
FIG. 5 shows a schematic of an AW designated travel lane at an airport.

In the case that the AAV has only arrived at an intermediate destination, for example, an airport departures terminal, a further embodiment provides for navigation directly to a departure gate, with optional stops at ticketing/baggage, and mandatory passage through airport security. See, e.g., FIG. 5. According to this embodiment, the user or a helper can enter the flight information such as the airport name, terminal number/name, flight date and time, and flight number into the AW system; or the QR code on the boarding pass may be scanned by the AW's QR scanner at home/origin before starting the trip. Once the AW has left the AAV, the AW takes the passenger to the airline counter if the boarding pass needs to be issued and/or luggage(s) needs to be checked. The AW then takes the passenger to the security checkpoint, and then to the gate.

In the case of such more complicated navigation, AW lanes are preferably provided for easy detection by AW sensors and maintain a predetermined travel path.

According to further functionality, the AW can be connected to the airport information network to be updated if the departure gate is changed. In addition, the AW may wirelessly connect to elevator controls to request one if needed. At the gate, the AW can be programmed go all the way to the user's assigned seat; upon landing in the destination city, the user can enter a new destination, and the AW will navigate the user off the plane, through the terminal, to an AAW meet location, and onto the AAW.

In the case that the AV and/or the AAW is rented, the AV and/or AAW may automatically and autonomously return to the rental location when the user has completed the rental period.

In order to add robustness to the system, dead reckoning (navigation by distance and time traveled) may be used to supplement the AW navigation process. According to this embodiment, wheel encoders in the AW may provide information about distance traveled for each wheel, which in turn will be used to approximate the positional offset of the AW from a known location, the known location identified for example by scanned QR code scanned, visual registration markers placed within line of sight of one or more outward facing cameras, and registration of previously determined visual features from the surroundings.

It will be appreciated by those skilled in the art that changes could be made to the preferred embodiments described above without departing from the inventive concept thereof. It is understood, therefore, that this invention is not limited to the particular embodiments disclosed, but it is intended to cover modifications within the spirit and scope of the present invention as outlined in the present disclosure and defined according to the broadest reasonable reading of the claims that follow, read in light of the present specification.

The invention claimed is:

1. A device comprising:
   a wheelchair having a user seat and seat back;
   drive wheels;

a motor coupled to said drive wheels, a wheelchair computer in electronic communication with said motor, said wheelchair computer including a processor and non-transient memory, said non-transient memory including a global positioning system (GPS) and a navigation software module;

said wheelchair further comprising:

an input device in electronic communication with said wheelchair computer;

inertial sensors in electronic communication with said wheelchair computer;

a plurality of ultrasonic sensors in electronic communication with said wheelchair computer and configured to detect obstacles on or near a travel path of said device;

at least one Quick Response (QR) code reader in electronic communication with said wheelchair computer and configured to read QR codes;

a manual override input device in electronic communication with said wheelchair computer and configured to send a navigation interrupt signal to said navigation system;

an emergency contact input device in electronic communication with emergency service providers;

an antenna in electronic communication with said wheelchair computer configured for cellular-based internet connection;

said device further comprising:

a single occupancy level 4 or higher automated self-driving vehicle (AAV), said AAV comprising:

a wheelchair loading device;

a wheelchair securing mechanism;

an AAV onboard computer including a processor and non-transient memory configured to communicate wirelessly with said wheelchair computer to automatically activate said wheelchair loading device when said wheelchair approaches said AAV, to activate said wheelchair securing mechanism when said wheelchair is in an AAV transport position, wherein said wheelchair computer is configured to automatically hand over automated driving functions to the AAV onboard computer via electronic handshake once said wheelchair has entered said AAV, and wherein said AAV onboard computer is configured to accept automated navigation control from said wheelchair computer, said wheelchair computer further configured to automatically disengage said wheelchair from said wheelchair securing mechanism when said AAV has arrived at an intermediate destination, automatically move to the wheelchair loading device, and automatically navigate to a final destination.

2. The device according to claim 1, said wheelchair further comprising a canopy to protect the user from sun, rain, wind and/or snow.

3. The device according to claim 1, said wheelchair further including a mobile computing device holder.

4. The device according to claim 1, said wheelchair computer in electronic communication with a health care language interpreter network to assist users with language barriers.

5. The device according to claim 1, wherein said QR code readers configured to follow navigation lines and for identifying location(s) of the wheelchair.

6. The device according to claim 1, said input device configured to receive voice and/or text instructions.

7. The device according to claim 1, wherein said navigation software module is configured to receive instructions via said input device or from a remote device via wireless communication.

8. The device according to claim 1, said wheelchair further comprising a size-adjustable cargo carrier.

9. The device according to claim 1, wherein said manual override input device is a joystick.

10. An autonomous mobility system comprising the device of claim 1 and further comprising a plurality of printed QR codes placed on the ground along potential or actual AW travel routes.

* * * * *